(12) United States Patent
Heilenkötter et al.

(10) Patent No.: US 6,224,044 B1
(45) Date of Patent: May 1, 2001

(54) LEVEL CONTROL SYSTEM FOR A MOTOR VEHICLE

(75) Inventors: Carsten Heilenkötter, Weyhe; Thomas Matthies, Hannover; Stefan Sommer, Isernhagen, all of (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 09/487,873

(22) Filed: Jan. 20, 2000

(30) Foreign Application Priority Data

Jan. 20, 1999 (DE) .............................. 199 02 049

(51) Int. Cl.[7] .................................................. B60G 17/00
(52) U.S. Cl. ................... 267/64.16; 188/322.5; 303/15; 303/3; 280/735
(58) Field of Search ...................... 188/322.5; 267/64.16; 303/3, 15; 280/735, 6.15, 5.5

(56) References Cited

U.S. PATENT DOCUMENTS

| | | | |
|---|---|---|---|
| 4,076,275 | * 2/1978 | Hiruma | 280/124 F |
| 4,756,548 | * 7/1988 | Kaltenthaler et al. | 280/702 |
| 5,107,425 | * 4/1992 | Donges et al. | 364/424.03 |
| 5,440,487 | * 8/1995 | Althoff et al. | 364/424.05 |

FOREIGN PATENT DOCUMENTS

| | | | |
|---|---|---|---|
| 3825280 | 2/1990 | (DE) . | |
| 2213544 | * 8/1989 | (GB) | 267/64.16 |

* cited by examiner

*Primary Examiner*—Robert J. Oberleitner
*Assistant Examiner*—Xuan Lan Nguyen
(74) *Attorney, Agent, or Firm*—Walter Ottesen

(57) ABSTRACT

The invention is directed to a level control system for a motor vehicle wherein the controllable valves (8a to 8d and 10) are controlled by a first control unit (24). The first control unit (24) transmits a signal to a second control unit (36) at time intervals. If the second control unit (36) does not receive the signal expected from the first control unit, then the second control unit (36) assumes the control of the valves (8a to 8d and 10) in such a manner that the motor vehicle is transferred into a dynamically safe driving condition.

7 Claims, 4 Drawing Sheets

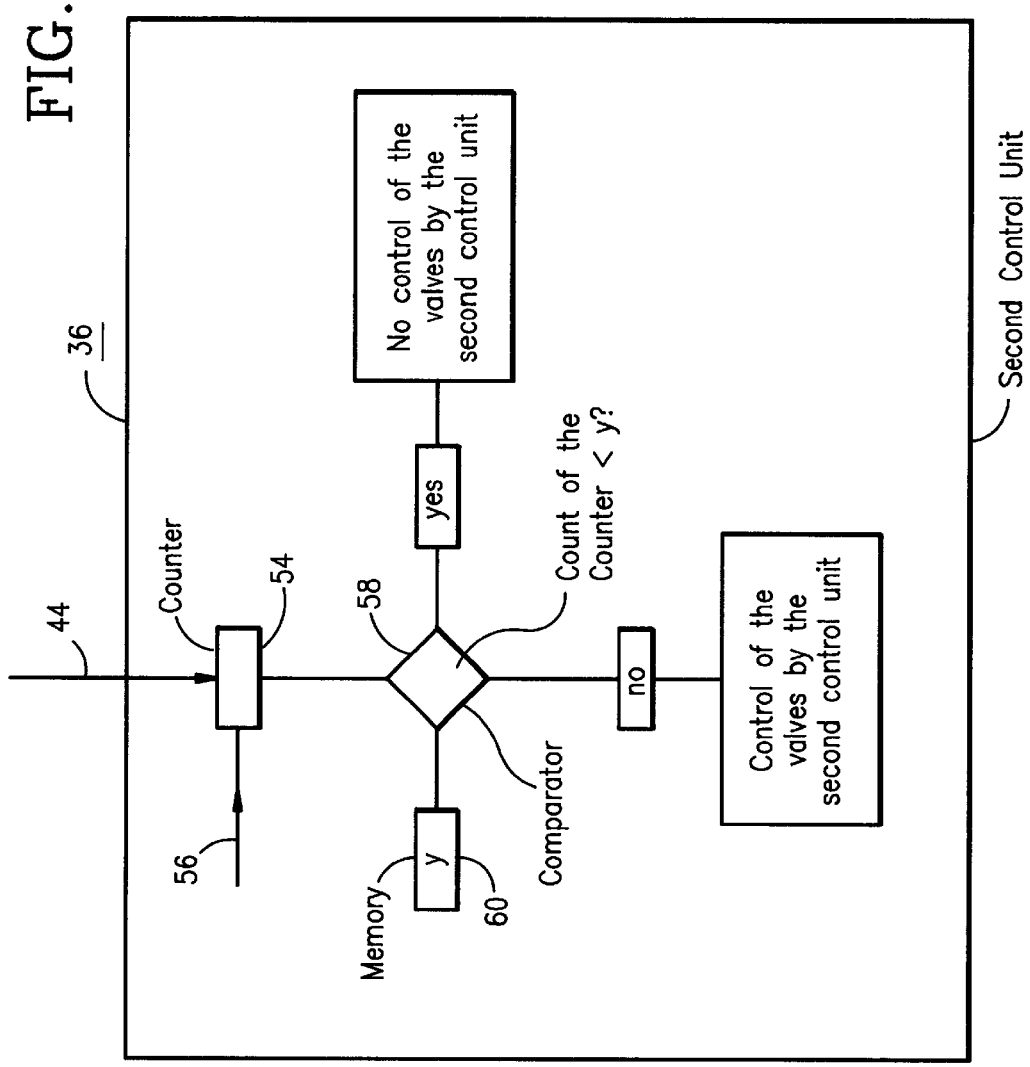

LEVEL CONTROL SYSTEM FOR A MOTOR VEHICLE

FIELD OF THE INVENTION

The invention relates to a level control system for a motor vehicle wherein the level control system includes air springs and each air spring is provided with a switchable valve for filling or venting (discharging) the corresponding air spring. A further switchable valve is provided by which each air spring can be connected to the atmosphere for venting. A first control unit controls the switchable valves for filling or venting the air spring.

BACKGROUND OF THE INVENTION

In recent times, modern motor vehicles have often been equipped with level control systems of the kind described above. These level control systems afford the advantage that the spacing of the vehicle chassis relative to a fixed reference point can be held constant independently of the state of loading of the vehicle. However, it is noted that modern level control systems are also burdened with a safety risk. For example, the situation can occur that a vehicle, which is equipped with a level control system, is heavily loaded. In this situation, the air pressure in the air springs must be increased by filling the latter in order to maintain the spacing of the vehicle chassis relative to the reference point constant. Correspondingly, after unloading the motor vehicle, the air pressure in the air spring must again be reduced by discharging the air spring. The filling and discharging of the air spring is controlled by the above-mentioned control unit in that this control unit transfers the switchable valves into a corresponding switching state. If a fault occurs in the first control unit during the loaded condition of the motor vehicle, then a discharge of the air springs is no longer possible, so that, after unloading the motor vehicle, the air pressure in the air springs can no longer be reduced. This has the consequence that the vehicle chassis is lifted relative to the reference point after the vehicle is unloaded. This can lead to the condition that the center of gravity of the motor vehicle after unloading lies very high so that the motor vehicle is in a dynamically unsafe driving condition.

A further safety risk can occur in an off-road vehicle equipped with a level control system. Accordingly, and to provide a large ground clearance of the off-road vehicle, the center of gravity of the vehicle can be brought to a very high level with the aid of the level control system. This takes place by filling the air springs with pressurized air. If the ground clearance of the off-road vehicle is no longer needed, then the air springs must be vented. The filling operation as well as the discharging operation are controlled by the above-mentioned control unit which transfers the switchable valves into a corresponding switching condition. A situation can occur wherein the off-road vehicle has a high ground clearance and a fault occurs in the first control unit which leads to a situation that the air springs can no longer be discharged. In such a situation, dropping the chassis of the off-road vehicle is no longer possible. The off-road vehicle is then in a dynamically unsafe driving condition because of the high center of gravity.

SUMMARY OF THE INVENTION

It is an object of the invention to provide a level control system which ensures the safety of the motor vehicle even when the first control unit functions defectively or not at all.

The level control system of the invention is for a motor vehicle and includes: a plurality of air springs; a plurality of controllable first valves connected to corresponding ones of the air springs for filling and venting the respective air springs; a controllable second valve switchable to connect the air springs to the atmosphere for venting the air springs; a first control unit for controlling the controllable first and second valves to fill or vent the air springs; a second control unit for controlling the controllable first and second valves to fill or vent the air springs; the first control unit having means for transmitting check signals to the second control unit at respective time intervals; and, the second control unit having checking means for checking whether the second control unit receives each of the check signals from the first control unit and, when one of the signals expected from the first control unit is not received, the second control unit functioning to assume control of the controllable first and second valves so as to drive the first and second valves to bring the motor vehicle into a dynamically safe driving condition.

The time intervals at which the first control unit transmits signals to the second control unit can, for example, be regular time intervals. As an alternative, it is also possible that time intervals are defined in the second control unit and that the second control unit checks with a test device as to whether a signal is transmitted from the first control unit to the second control unit in each time interval.

The basic idea of the invention is that the first control unit of the level control system is provided with a second control unit which concludes that a fault is present when an expected signal from the first control unit is not received and the second control unit assumes control of the switchable valves of the level control system in such a manner that the motor vehicle can be transferred at any time into a dynamically safe driving condition.

The advantages achieved with the invention are especially that the safety of the motor vehicle is ensured even when the first control unit malfunctions because, in this case, no signals are transmitted by the first control unit to the second control unit and the second control unit then assumes the control of the switchable valves. A further advantage of the invention is that the additional costs which arise are low notwithstanding the increase in safety in the level control system because only a second control unit must be made available which assumes only a simple control function, namely, the transfer of the motor vehicle into a dynamically safe driving condition.

According to a first embodiment of the invention, the second control unit opens the switchable valves when it does not receive a signal expected from the first control unit so that each air spring of the level control system is connected to the atmosphere. In this embodiment, it is possible that the switchable valves of the level control system are not driven again by the second control unit and remain open. In this case, the air pressure in the air springs drops down to atmospheric pressure. The air springs can then no longer support the chassis independently of the loaded state so that the chassis sets down on the bumpers of the shock absorbers and therefore assumes the lowest possible center of gravity. The motor vehicle is in a dynamically safe driving condition because of this lowest possible center of gravity of the vehicle body. The advantage of this first embodiment of the invention is that the second control unit can be configured very simply because it needs to drive the switchable valves only once to open and the valves thereafter remain in the open condition. A further advantage of the embodiment is that the level control system requires no elevation sensors for control and therefore is cost effective.

According to another feature of the first embodiment, the second control unit maintains, by opening the switchable valves, the condition in which each air spring of the level control system is connected to the atmosphere and this condition is maintained over a pregiven time span. After the elapse of this pregiven time span, the second control unit closes the switchable valves. The pregiven time span is so dimensioned that the air springs discharge within this time span to the extent that the motor vehicle assumes the lowest possible level condition. In this feature too, the lowest possible level condition is characterized in that the air springs have been controlled down so far that the vehicle body of the motor vehicle sets down on the bumpers of the shock absorbers and the center of gravity of the vehicle body therefore assumes the lowest possible condition. For this reason, the motor vehicle is in a dynamically safe driving condition. The advantage of this feature will become clear from the following.

The switchable valves of the level control system are transferred by the second control unit into the open state via a control current. The control current must be maintained as long as the switchable valves are intended to remain open. By withdrawing the control current, the switchable valves transfer into their closed base condition. Because of the control current, heat develops in the second control unit as well as in the switchable valves because of ohmic losses which can especially damage the valves. Accordingly, if the valve opening time is limited to a time span which is so dimensioned that the air springs can discharge within this time span to the extent that the vehicle assumes the lowest possible level condition, a current flows through the valves only during this time span. In this way, the development of heat can be neglected and a damage of the valves is precluded. It has been shown that a time span of 30 to 60 seconds is adequate in order to discharge the air springs.

According to a second embodiment of the invention, the system further includes at least one elevation sensor which generates an elevation signal dependent upon the level of the motor vehicle. The second control unit functions to evaluate the elevation signal of the elevation sensor at least in those time spans during which the second control unit assumes the control of the controllable first and second valves and the second control unit also functions to open the controllable first and second valves and connect all of the plurality of air springs to the atmosphere until the evaluation of the elevation signal indicates that the motor vehicle is in a pregiven dynamically safe elevation region when:

(a) the second control unit does not receive the check signal expected from the first control unit; and, (b) the evaluation of the elevation signal shows that the level of the motor vehicle lies above a pregiven level.

The advantage of this second embodiment of the invention is that the switchable valves of the level control system are only driven by the second control unit when the evaluation of the elevation sensor signal indicates that the vehicle is not in a dynamically safe elevation region. For the second embodiment of the invention too, the dynamically safe driving condition of the motor vehicle can be characterized in that the vehicle body of the motor vehicle assumes the lowest possible condition. As an alternative, an elevation region of the vehicle body compared to a fixed reference point can be pregiven as a dynamically safe elevation region. If the vehicle body is above this elevation region, then the valves of the level control system are opened by the second control unit until the motor vehicle is in the pregiven elevation region.

In another embodiment of the invention, the second control unit further functions to continuously evaluate the elevation signal of the elevation sensor. The second control unit further functions to open the controllable first and second valves and to so connect the plurality of air springs to the atmosphere until the evaluation of the elevation signal shows that the motor vehicle is in a pregiven dynamically safe elevation region when the evaluation of the elevation signal shows that the level of the motor vehicle lies above a pregiven level independently of whether the check signal expected from the first control unit is received.

In this embodiment too, the dynamically safe elevation region can be so selected as has already been explained above.

The advantage of this improvement is seen in that the motor vehicle is transferred into a dynamically safe driving condition by the second control unit even when every expected signal is transmitted from the first control unit to the second control unit but the first control unit operates defectively (for example, because of a defective program sequence) and permits that the motor vehicle is in a dynamically unsafe driving condition (that is, for example, the first control unit permits the air springs to be filled with pressurized air even though the motor vehicle is not loaded and the vehicle body of the motor vehicle is raised very substantially).

According to another feature of the invention, the second control unit functions to transmit additional signals to the first control unit at time intervals and the first control unit includes checking means for checking whether the first control unit receives each of the additional signals from the second control unit and the first control unit functions to actuate a warning device when the first control unit does not receive the additional signal expected from the second control unit.

The warning device can, for example, comprise a signal lamp which indicates to the driver of the motor vehicle that a fault is present in the level control system. Alternatively, the warning device can be configured as a writable memory in the first control unit wherein the entry is made that the second control unit did not announce itself to the first control unit as expected. With the next inspection of the motor vehicle, this fault memory in the first control unit can be read out and the fault, if required, can be corrected. The advantage of this feature is that the function of the second control unit can be checked in a simple manner and that measures can be initiated early for the complete restoration of the level control system.

According to another feature of the invention, the checking device in the second control unit contains a continuously counting counter which is reset by each signal transmitted from the first control unit. The second control unit takes over the control of the switchable valves when the count of the counter reaches a predetermined value. The checking device present, as needed, in the first control unit can be configured in the same way. The predetermined count of the counter can, for example, be at 100 and the count of the counter can, for example, be incremented by 1 each millisecond by a pulse generated in the second control unit. If the counter is once reset by a signal of the first control unit, then it would take 100 milliseconds until the counter reaches the predetermined value of 100. After the last signal which resets the counter, the first control unit must transmit a further signal to the second control unit (at the latest 99 milliseconds thereafter) so that the counter in the second control unit is reset before the pregiven value of 100 is reached and the control of the valves is assumed by the second control unit. Accordingly, a time interval is defined by the counter (in the example, the time interval has the length of 100 milliseconds) and the second control unit is checked as to whether, for each time interval, a signal is transmitted from the first control unit to the second control unit, which resets the counter. The advantage of this feature is that the checking device in the second control unit can be configured in a simple manner.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
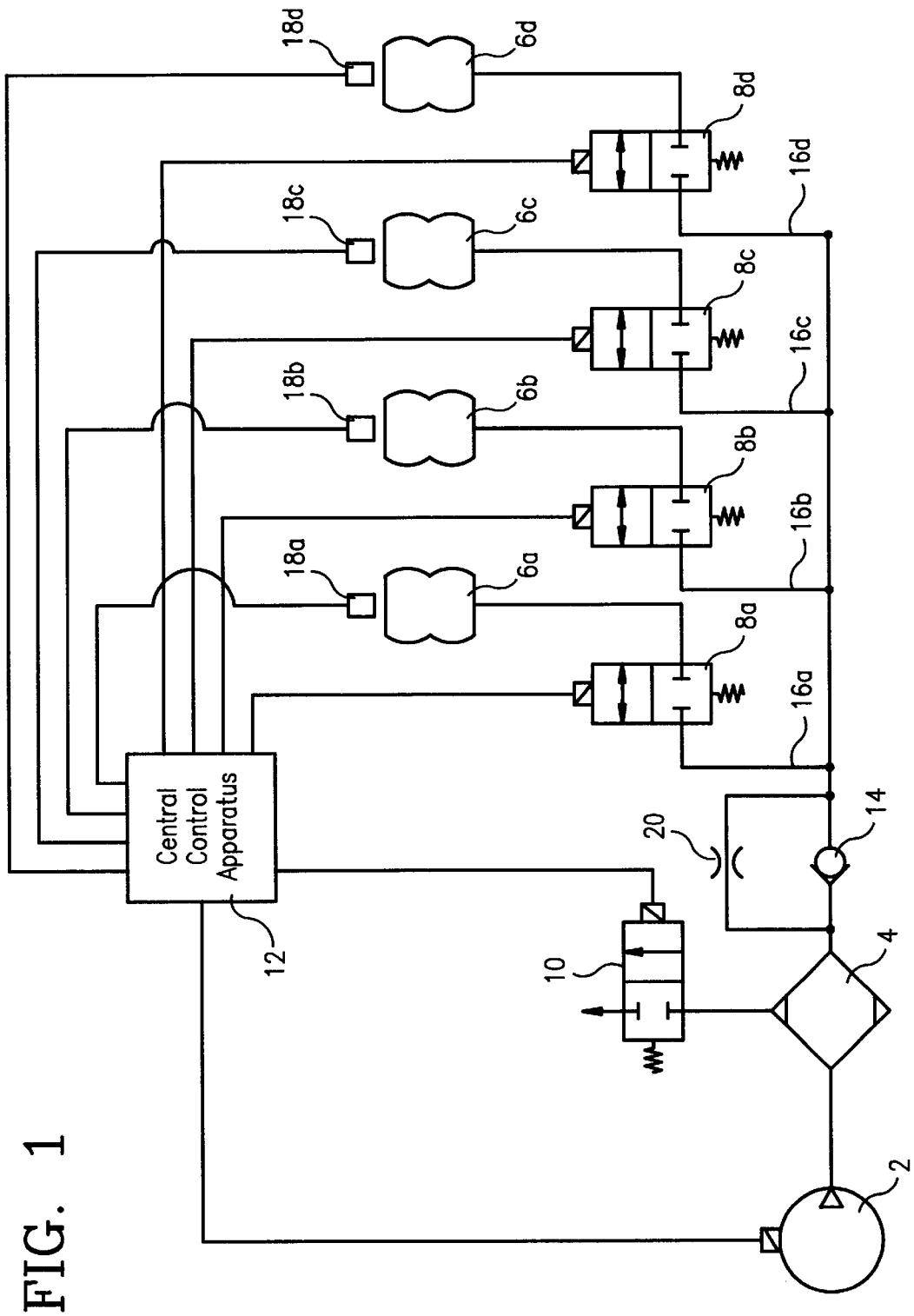
FIG. 1 is a schematic of an embodiment of the level control system according to the invention.

FIG. 1 shows a schematic of a level control system for a motor vehicle which, inter alia, includes a pressure source 2, an air dryer 4 and air springs 6a to 6d. Each of the air springs 6a to 6d is assigned a controllable valve (8a to 8d) for filling or venting the corresponding air spring 6a to 6d. Furthermore, the control system includes an additional controllable valve 10 via which each controllable valve 6a to 6d can be connected to the atmosphere for venting. In the embodiment shown, the controllable valves 8a to 8d and 10 are configured as electrically controllable valves. The controllable valves 8a to 8d and 10 are controlled by the central control apparatus 12 of the level control system.

FIG. 1 shows the level control system in its basic state wherein the controllable valves 8a to 8d and 10 are in a switching state which permits neither a filling nor a venting of the air springs 6a to 6d. To fill the air springs 6a to 6d, the valves 8a to 8d are driven by the central control apparatus 12 and are transferred from the basic state shown in FIG. 1 into a second switching state. Air can then be pumped from the pressure source 2 via the air dryer 4, the check valve 14 and through the pressurized air lines 16a to 16d into corresponding ones of the air springs 6a to 6d. The check valve 14 opens toward the air springs 6a to 6d. Elevation sensors 18a to 18d are assigned to respective ones of the air springs 6a to 6d. If, with the aid of the elevation sensors 18a to 18d, it is determined that the vehicle body of the motor vehicle assumes a specific spacing relative to a reference point, then a filling operation is ended. This takes place in that the electrically controllable valves 8a to 8d are switched by the central control apparatus 12 to be without current and, as a consequence thereof, transfer again into the basic state shown in FIG. 1.

To control down or vent the air springs 6a to 6d, the electrically controllable valves 8a to 8d and 10 are driven again by the central control apparatus 12 so that the valves transfer from the basic state shown in FIG. 1 into its second switching state. Each air spring 6a to 6d is then connected to the atmosphere via the pressurized air lines 16a to 16d, the throttle 20, the air dryer 4 and the valve 10. The venting operation is ended when, with the aid of the elevation sensors 18a to 18d, a determination is made that the vehicle body of the motor vehicle assumes a pregiven elevation relative to a specific reference point. The signals of the elevation sensors 18a to 18d are evaluated in the central control apparatus 12. The above takes place in that the electrically controllable valves 8a to 8d and 10 are switched to be without current by the central control apparatus 12 so that these valves again transfer from their second switching state to the basic state shown in FIG. 1.

Figure 2:
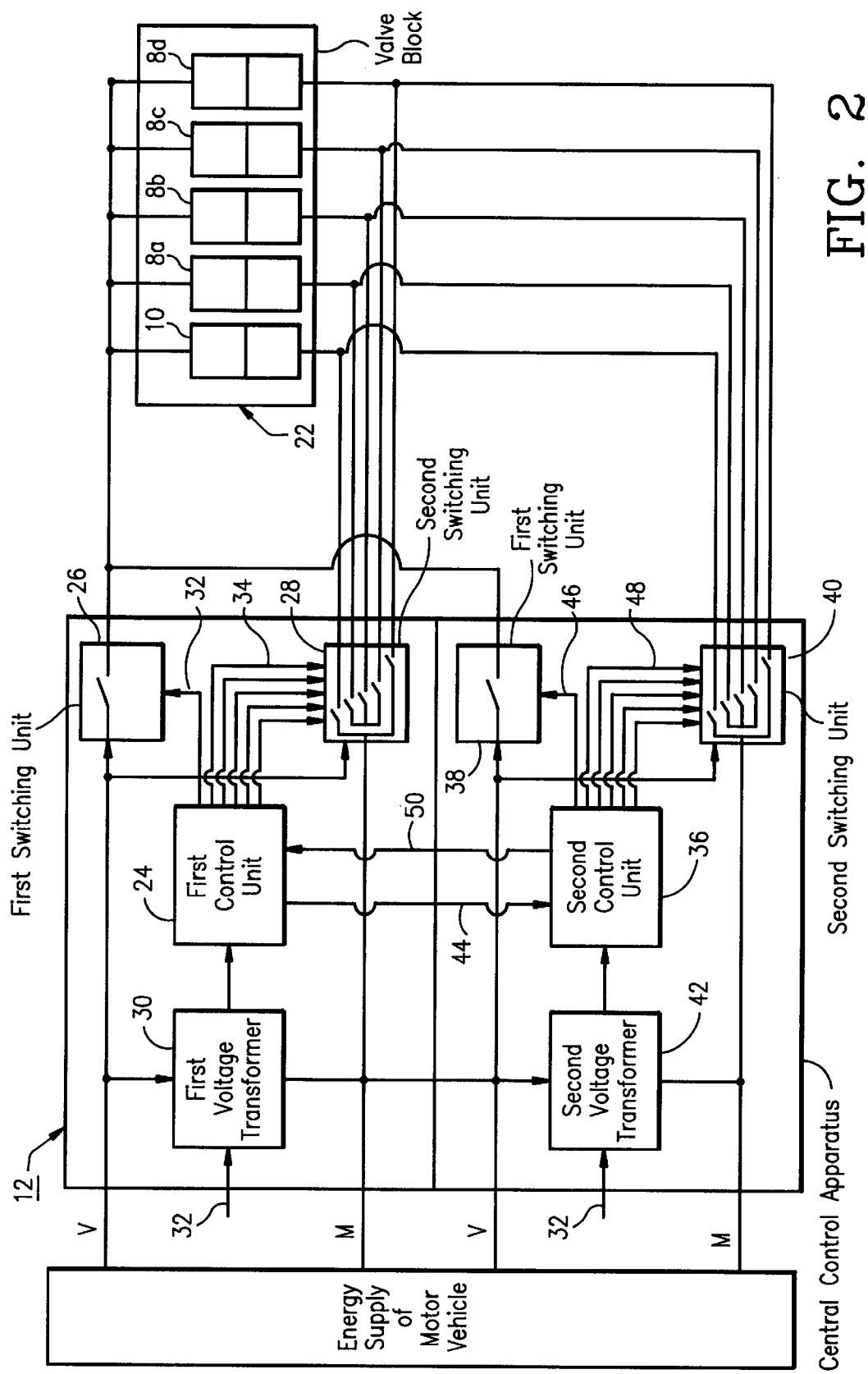
FIG. 2 is a block diagram showing the central control apparatus and a valve block including a plurality of valves.

FIG. 2 is a block diagram wherein the central control apparatus 12 and a valve block 22 having valves 8a to 8d and 10 is shown. The central control apparatus 12 includes a first control unit 24 in the form of a microprocessor, a first switching unit 26 and a second switching unit 28. The first switching unit 26 is connected to the energy supply V of the motor vehicle via a voltage transformer 30. If the voltage transformer 30 is additionally connected to ground M (for example, by means of the ignition signal 32 which closes a switch), the voltage transformer 30 converts the voltage supplied by the energy source V into the voltage needed by the first control unit 24. If the first control unit 24 is supplied with energy via the voltage transformer 30, then the control unit 24 can control the electrically controllable valves 8a to 8d and 10 as explained in connection with FIG. 1. The controllable valves 8a to 8d and 10 are connected in the valve block 22.

If, for example, the air springs 6a to 6d (see FIG. 1) are to be filled, then the valves 8a to 8d have to be driven and transferred from their basic state into their other switching state. For this purpose, a signal is supplied to the first switching unit 26 from the first control unit 24 via the signal line 32 so that, as a consequence, the switch in the switching unit 26 closes and all valves 8a to 8d and 10 are connected to the energy source V of the motor vehicle. Furthermore, the valves 8a to 8d are connected to ground M via the second switching unit 28. This takes place in that the first control unit 24 applies a signal to the signal lines 34 corresponding to valves 8a to 8d so that, as a consequence of the signals on the signal lines 34, the switches, which are assigned to the valves 8a to 8d, close in the second switching unit 28 (when filling the air springs 6a to 6d, no signal is outputted from the first control unit 24 on the signal line 34 which is assigned to the valve 10 so that the corresponding switch in the second switching unit 28 is not closed and therefore the valve 10 is not connected to ground and, as a consequence thereof, remains in its basic state). If the valves 8a to 8d are connected to ground via the signals on the corresponding signal lines 34, then these valves 8a to 8d go from the basic state shown in FIG. 1 into the first switching state. The air springs can then be filled with pressurized air (see FIG. 1).

To down-control or vent the air springs, the first control unit 24 outputs the same signals on the signal lines 32 and 34 as explained in connection with the filling of the air springs. Additionally, a signal is now also outputted on the signal line 34 corresponding to the valve 10. As a consequence thereof, the switch assigned to this valve 10 in the second switching unit 28 closes so that the valve is also connected to ground and transfers from its basic state shown in FIG. 1 into the first switching state. The air can then escape from the air springs 6a to 6d into the atmosphere as already explained with respect to FIG. 1.

In addition to the above-mentioned components, the central control apparatus 12 includes a second control unit 36 which has assigned thereto a separate first switching unit 38 and a separate second switching unit 40 and which likewise can be configured as a microprocessor or a hard-wired unit. The second control unit 36 is connected via a second voltage transformer 42 to the energy source V of the motor vehicle. When the second voltage transformer 42 is connected to ground M, the second control unit 36 is supplied with energy from the energy source V of the motor vehicle.

The first control unit 24 transmits, in time-dependent intervals, a signal via a signal line 44 to the second control unit 36. The second control unit 36 includes a checking device wherein a check is made as to whether the second control unit 36 receives each signal expected from the first control unit 24. If a signal, which is expected from the first control unit 24, is not received by the second control unit 36, then the second control unit assumes the control of the controllable valves 8a to 8d and 10 in such a manner that the motor vehicle is transferred into a dynamically safe driving condition by the second control unit 36 driving the controllable valves 8a to 8d and 10.

In the embodiment of the invention shown in FIG. 2, the foregoing takes place in that the second control unit 36 applies a signal to the signal line 46 and to all signal lines 48. Thereupon, the switch in the first switching unit 38 and all switches in the second switching unit 40 are closed so that the control inputs of all controllable valves 8a to 8d and 10 are connected to the energy source V as well as to ground M. The controllable valves 8a to 8d and 10 then transfer from the basic state shown in FIG. 1 into the second switching state so that all air springs 6a to 6d are connected to the atmosphere as was explained in connection with FIG. 1. In the simplest case, the signal is applied to the signal lines 46 and 48 for an undetermined time. The air springs 6a to 6d are then completely emptied so that the vehicle body of the motor vehicle seats on the bumpers and assumes a low center of gravity. The vehicle is then in a dynamically safe driving condition.

Preferably, the signals on the signal lines 46 and 48 are, however, only maintained by the second control unit 36 over a pregiven time span which is checked in the second control unit 36, for example, with the aid of a counter. After the elapse of the pregiven time span, no more signals are outputted by the second control unit 36 onto the signal lines 46 and 48 so that the controllable valves 8a to 8d and 10 transfer from their first switching state again into the basic state shown in FIG. 1. The pregiven time span is so dimensioned that the air springs 6a to 6d empty within this time span so far that the vehicle body of the motor vehicle sets down on the bumpers of the motor vehicle and the center of gravity of the motor vehicle therefore assumes its lowest possible level. It has been shown that approximately 30 to 60 seconds are sufficient in order to reach this condition so that the signals must only be applied to the lines 46 and 48 over this time span.

According to a further embodiment of the invention, the second control unit 36 transmits a signal to the first control unit 24 via a signal line 50 at regular time intervals. In a checking device of a first control unit, a check is made as to whether the first control unit 24 receives each of the signals expected from the second control unit 36. If an expected signal is not received in the first control unit, then a warning device, for example, in the form of a warning lamp is actuated by the first control unit 24.

FIG. 2 shows that the second control unit 36 is connected via a separate supply path to the energy source V or to ground M and that a separate first switching unit 38 and a separate second switching unit 40 are assigned to the second control unit 36. With this redundancy, the safety in the level control system is increased. However, it is also possible that the second control unit 36 does not have a separate switching unit 38 and no separate second switching unit 40 assigned thereto and the second control unit 36 rather drives the switches in the first switching unit 26 or in the second switching unit 28.

Figure 3:
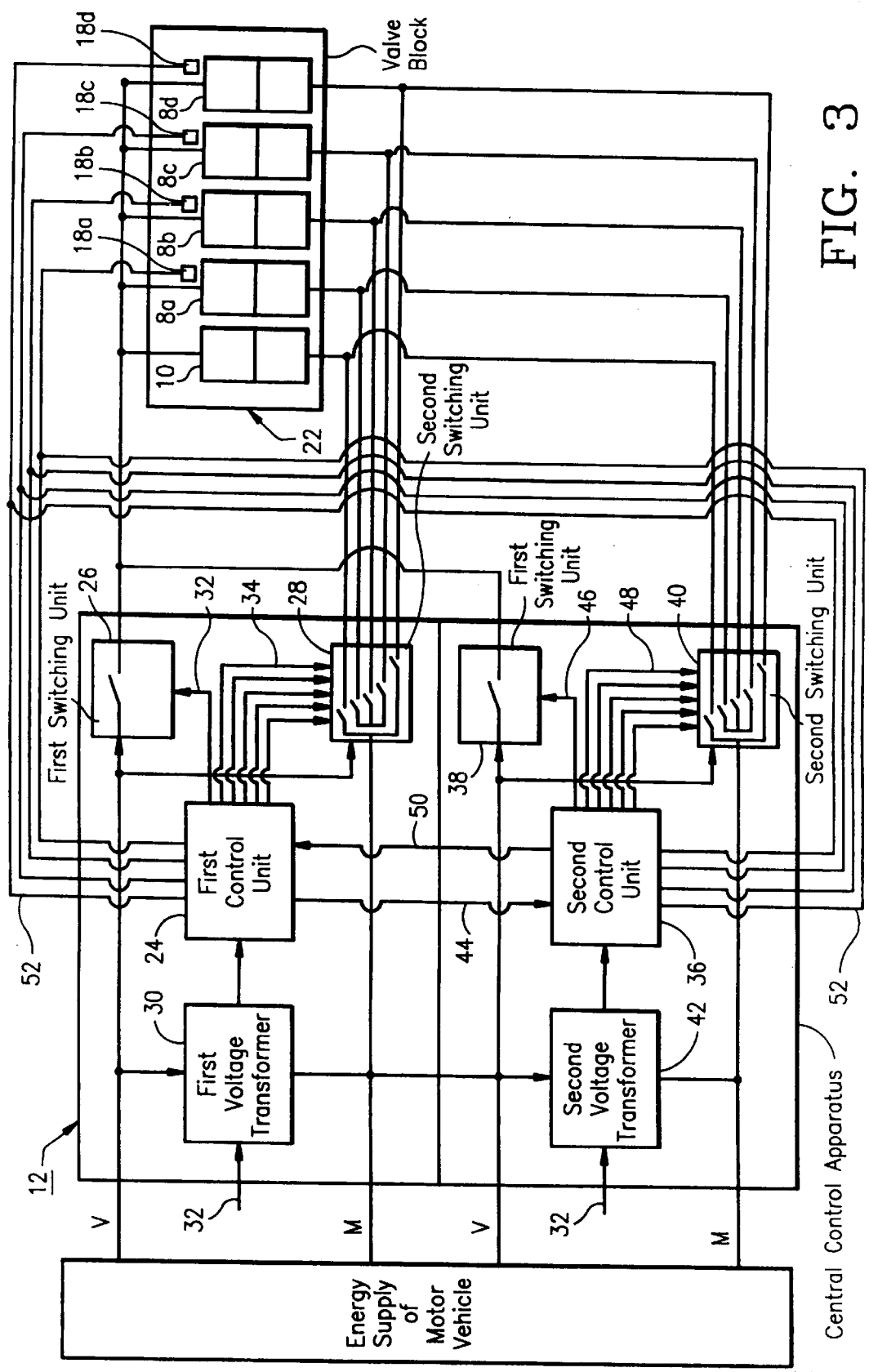
FIG. 3 is a block diagram of an embodiment according to the invention wherein each air spring is provided with an elevation sensor; and, FIG. 4 is a block diagram showing the configuration of a checking device located in the second control unit.

FIG. 3 shows an embodiment of the invention in which each air spring 6a to 6d is provided with an elevation sensor 18a to 18d (see also FIG. 1). The signals of the elevation sensors 18a to 18d are transmitted via signal lines 52 to the first control unit 24 as well as to the second control unit 36. Furthermore, the embodiment of the invention according to FIG. 3 has the same configuration and the same operability as the embodiment shown in FIG. 2 so that reference is made to the description provided for FIG. 2.

If the second control unit 36 does not receive an expected signal from the first control unit 24, then the second control unit assumes the control of the switchable valves 8a to 8d and 10. The second control unit 36 evaluates the signals of the elevation sensors at least in the time spans in which the second control unit assumes the control of the switchable valve 8a to 8d and 10. If, in such a time span, it is determined by the second control unit 36 based on the signals of the elevation sensors 18a to 18d that the level of the motor vehicle lies above the pregiven level, then the switchable valves 8a to 8d and 10 are opened at least so long and, in this way, all air springs 6a to 6d are connected to the atmosphere until the evaluation of the signals of the elevation sensors 18a to 18d indicates that the motor vehicle is in a pregiven dynamically safe elevation region. The opening of the switchable valves 8a to 8d and 10 takes place in the same manner as already described with respect to FIG. 2. If the motor vehicle is in the pregiven level range, then the switchable valves 8a to 8d and 10 are again transferred by the second control unit 36 into the basic state. This takes place in the same manner as already described with respect to FIG. 2.

Preferably, the signals of the elevation sensors 18a to 18d are evaluated by the second control unit not only in the above-mentioned time spans but are continuously evaluated. If the evaluation of the signals shows that the level of the motor vehicle lies above a pregiven level, then the switchable valves 8a to 8d and 10 are also opened by the second control unit when the second control unit 36 receives all expected signals from the first control unit 24. The switchable valves 8a to 8d and 10 remain open until the evaluation of the signals of the elevation sensors 18a to 18d in the second control unit 36 indicates that the vehicle is in a pregiven dynamically safe elevation region. Then, the controllable valves 8a to 8d and 10 are again transferred by the second control unit 36 into the base state. The switching of the valves 8a to 8d and 10 by the second control unit 36 takes place in the same manner as already described with respect to FIG. 2.

FIG. 4 is exemplary of the configuration of a checking device located in the second control unit 36. The checking device has, inter alia, a counter 54. A pulse is applied via signal line 56 to the input of the counter at regular time intervals and this pulse increments the count of the counter 54 each time by one. The pulse can, for example, be a clock signal of the second control unit 36 if this control unit is configured as a microprocessor. The actual count of the counter 54 is compared in a comparator 58 to a pregiven count Y which is stored in a memory 60. In the comparator 58, a check is made whether the count of the counter 54 is less than the pregiven value Y. If this is the case, then the control of the valves 8a to 8d and 10 is not assumed by the second control unit 36. Instead, the valves continue to be controlled by the first control unit 24. If, in contrast, the count of the counter 54 reaches the value Y, then the control of the valves 8a to 8d and 10 is assumed by the second control unit 36 as explained in connection with FIGS. 2 and 3.

A reset signal is conducted from the first control unit 24 to the counter 54 at time intervals via a signal line 44. With this reset signal, the count of the counter 54 is reset to zero. If the counter 54 requires a certain time to count from zero to the value Y, which is stored in memory 60, then the counter 54 must be reset in each time interval from zero to Y by a reset signal. If no reset signal is conducted to the counter 24 in a time interval, then the count reaches the pregiven value Y and the comparator 58 supplies the result "no" and the control of the valves 8a to 8d and 10 is assumed by the second control unit 36.

As an example, the value Y=100 is stored in the memory 60 and the counter 54 has the start value of zero. If a pulse is outputted to the counter 54 every millisecond via the signal line 56, then the counter 54 reaches the count 100 within 100 milliseconds if, within the 100 milliseconds, no reset signal is applied to the counter 54 via the signal line 44 which would reset the counter to zero. In this case, the control of the valves 8a to 8d and 10 is assumed by the second control unit 36. If, in contrasts a reset signal is applied to the counter 54 via signal line 44 within the 100 milliseconds at any desired time point, then the counter 54 is reset to zero and the procedure begins anew. The control of the valves 8a to 8d and 10 is then not assumed by the second control unit 36, instead, continues to be provided by the first control unit 24 and for so long until, within a time interval of 100 milliseconds, a reset signal is not provided by the first control unit 24.

It is understood that the foregoing description is that of the preferred embodiments of the invention and that various changes and modifications may be made thereto without departing from the spirit and scope of the invention as defined in the appended claims.

What is claimed is:

1. A level control system for a motor vehicle, the system comprising:
   a plurality of air springs;
   a plurality of controllable first valves connected to corresponding ones of said air springs for filling and venting the respective air springs;
   a controllable second valve switchable to connect said air springs to the atmosphere for venting said air springs;
   a first control unit for controlling said controllable first and second valves to fill or vent said air springs;
   a second control unit for controlling said controllable first and second valves to fill or vent said air springs;
   said first control unit having means for transmitting check signals to said second control unit at respective time intervals; and,
   said second control unit having checking means for checking whether said second control unit receives each of said check signals from said first control unit and, when one of said signals expected from said first control unit is not received, said second control unit functioning to assume control of said controllable first and second valves so as to drive said first and second valves to bring said motor vehicle into a dynamically safe driving condition.

2. The level control system of claim 1, wherein said second control unit functions to open said controllable first and second valves so as to cause each of said air springs to be connected to the atmosphere when said second control unit does not receive the expected signal from said first control unit.

3. The level control system of claim 2, wherein said second control unit functions to open said controllable first and second valves to maintain a condition wherein each of said air springs is connected to the atmosphere over a pregiven time span; and, after said time span elapses, said second control unit functions to close said controllable first and second valves; and, said pregiven time span being so dimensioned that said air springs are emptied to the extent that said motor vehicle assumes the lowest possible level within said pregiven time span.

4. The level control system of claim 1, wherein said system further comprises at least one elevation sensor which generates an elevation signal dependent upon the level of said motor vehicle;
   said second control unit functioning to evaluate said elevation signal of said elevation sensor at least in those time spans during which said second control unit assumes the control of said controllable first and second valves; and,
   said second control unit functioning to open said controllable first and second valves and connect all of said plurality of air springs to the atmosphere until the evaluation of said elevation signal indicates that said motor vehicle is in a pregiven dynamically safe elevation region when:
      (a) said second control unit does not receive the check signal expected from said first control unit; and,
      (b) the evaluation of said elevation signal shows that the level of said motor vehicle lies above a pregiven level.

5. The level control system of claim 4, further comprising:
   said second control unit functioning to continuously evaluate said elevation signal of said elevation sensor;
   said second control unit further functioning to open said controllable first and second valves and to so connect said plurality of air springs to the atmosphere until the evaluation of said elevation signal shows that said motor vehicle is in a pregiven dynamically safe elevation region when the evaluation of said elevation signal shows that the level of said motor vehicle lies above a pregiven level independently of whether said check signal expected from said first control unit is received.

6. The level control system of claim 1, wherein said second control unit functions to transmit additional signals to said first control unit at time intervals; said first control unit including checking means for checking whether said first control unit receives each of said additional signals from said second control unit and said first control unit functioning to actuate a warning device when said first control unit does not receive said additional signal expected from said second control unit.

7. The level control system of claim 1, said checking means in said second control unit including a continuously counting counter which is reset by each of said check signals transmitted from said first control unit; and, said second control unit assuming the control of said controllable first and second valves when the count of said counter exceeds a predetermined value.

* * * * *